United States Patent [19]

Ritsema et al.

[11] 4,085,826
[45] Apr. 25, 1978

[54] BRAKE WEAR INDICATOR

[75] Inventors: Irving Ray Ritsema; John Lewallen Turak, both of South Bend, Ind.

[73] Assignee: The Bendix Corporation, South Bend, Ind.

[21] Appl. No.: 750,105

[22] Filed: Dec. 13, 1976

[51] Int. Cl.² ............................................. F16D 66/02
[52] U.S. Cl. ................................ 188/1 A; 116/114 Q
[58] Field of Search ..................... 188/1 A; 116/114 Q

[56] References Cited

U.S. PATENT DOCUMENTS

| | | | |
|---|---|---|---|
| 3,141,524 | 7/1964 | Mishler | 188/1 A |
| 3,958,666 | 5/1976 | Hooten et al. | 188/1 A |

FOREIGN PATENT DOCUMENTS

| | | | |
|---|---|---|---|
| 2,224,330 | 10/1974 | France | 188/1 A |
| 1,928,722 | 12/1970 | Germany | 188/1 A |
| 2,502,726 | 7/1975 | Germany | 188/1 A |
| 2,537,622 | 11/1976 | Germany | 188/1 A |
| 19,048 | 11/1969 | Japan | 188/1 A |

*Primary Examiner*—George E. A. Halvosa
*Attorney, Agent, or Firm*—Paul David Schoenle; Ken C. Decker

[57] ABSTRACT

A brake wear indicator includes a prong and at least one flange that vibrates when the prong engages a rotating disc or drum. The brake wear indicator comprises a generally U-shaped spring clip with one end secured to a friction element and the other end terminating in the prong. A pair of friction elements are engageable with the disc or drum to retard rotation thereof and are worn to a predetermined dimension at which the prong engages the rotating disc or drum in order to vibrate the flange, thereby generating an audible warning signal. In a disc brake the flange on the brake wear indicator extends into a space defined below a bridge portion of a caliper which urges the friction elements into engagement with the disc and above the friction elements and disc.

1 Claim, 7 Drawing Figures

BRAKE WEAR INDICATOR

BACKGROUND OF THE INVENTION

Brake wear indicators are provided in the prior art for warning a motor vehicle operator when a friction element is worn to a predetermined dimension, as a result of repeated engagement with a rotating member. Generally, these brake wear indicators either energize an electrical signal or generate an audible sound to alert the operator.

With reference to the audible sound type of indicator, it is desirable that the structure thereof fit within the existing assembly of a brake and also generate a loud-enough sound to be heard by the operator.

SUMMARY OF THE INVENTION

The present invention is an improvement of Application Ser. No. 734,907, filed Oct. 22, 1976, "Disc Brake Wear Indicator" by William J. Kestermeier.

A brake wear indicator comprises a generally U-shaped spring clip with one end being fixed to a friction element that is engageble with a rotating member to retard the rotation thereof. The other end terminates in a prong that engages the rotating member when the friction element is worn to a predetermined dimension. The spring clip is generally a longitudinal body of substantially uniform width; however, adjacent the prong there is provided at least one outwardly extending flange. In view of the proximity of the flange to the prong, the flange is excited or vibrated whenever the prong is scraping against or engaging the rotatable member, in order to generate an audible signal.

Even though the probe itself is vibrated during engagement with the rotating member to generate an audible signal, the provision of the extending flange produces a loud audible signal to insure that the operator is aware of the worn condition of the friction element.

In the disc brake embodiment of the invention the flange extends into a space below the bridge portion of a caliper and above the disc and friction elements. Consequently, the flange remains in spaced relation to the disc brake components so that it is free to vibrate.

DETAILED DESCRIPTION

Figure 1:
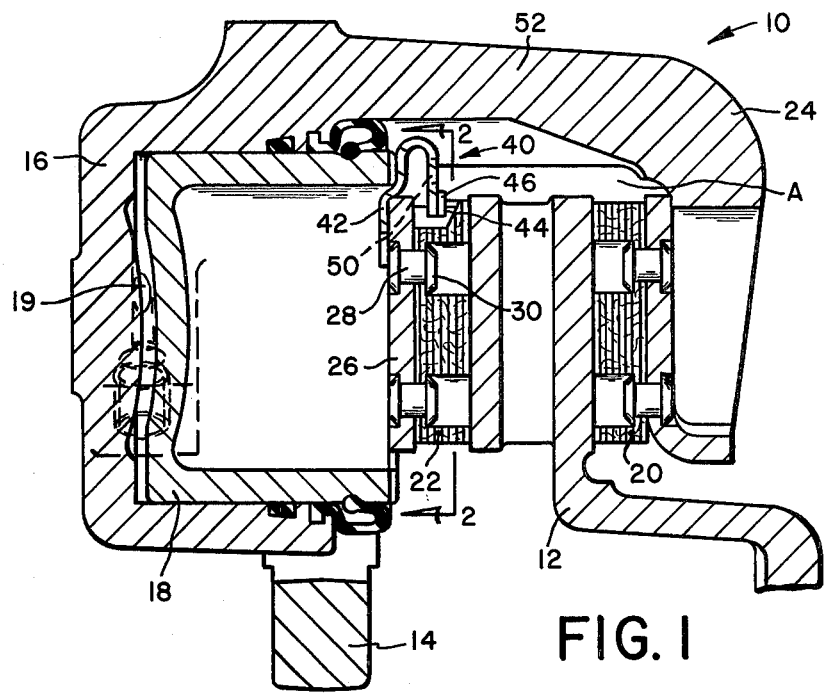
FIG. 1 is a fragmentary cross-sectional view of a disc brake showing a piston cup urging a friction element toward a disc.

Turning to the fragmentary view of FIG. 1, a disc brake is illustrated in general by the numeral 10. A disc or rotor 12 is secured to the rotating portion of an axle housing (not shown) and rotates therewith. The non-rotating portion of the axle housing supports the torque member 14, which in turn slidably supports the caliper 16. The caliper 16 slidably carries a piston cup 18 which is responsive to pressurized fluid from port 19 to move towards disc 12.

A pair of friction elements 20 and 22 are disposed on opposite sides of the disc 12 and are engageable therewith when the piston cup 18 moves toward the disc 12 in order to retard the rotation of the disc 12. The outer friction element 20 is secured by any suitable means to a reaction arm 24 of the caliper 16, while the axially inner friction element 22 includes a backing plate 26 and is secured thereto by means of rivets 28. The inner friction element 22 is slidably mounted on either the caliper 16 of the torque member 14 for axial movement relative to the disc 12.

In accordance with a preferred embodiment of the invention, a brake wear indicator or spring clip 40 is connected by any suitable means, such as welding, at one end 42 to the inside surface of the friction element 22. Extending therefrom the spring clip is generaly a U-shaped cantilever spring that extends around the radially outer edge of the backing plate 26. A pair of prongs or probes 44 are formed at the other end by axially outwardly turning flanges 46, which together with the generally U-shaped spring clip 40 vibrate to generate an audible signal when either prong 44 scrapes against the rotating disc 12.

Figure 2:
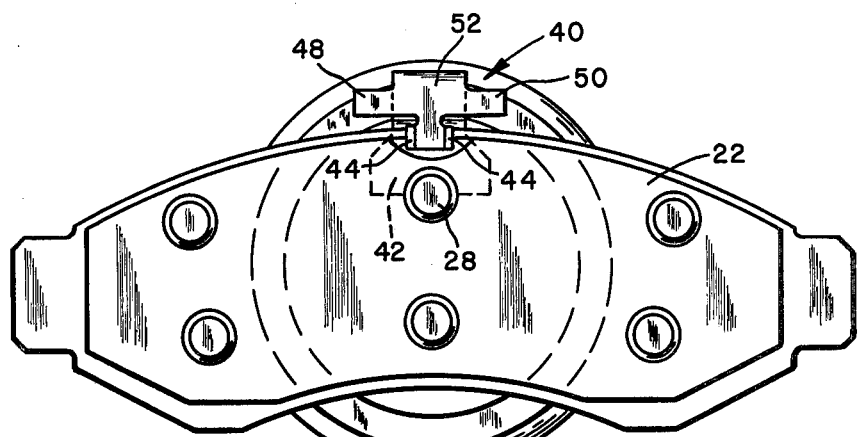
FIG. 2 is a right-side view of FIG. 1 taken along line 2—2.
Figure 3:
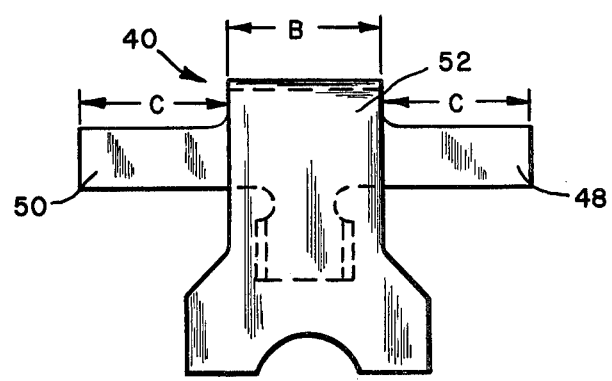
FIG. 3 is a left-side view of the brake wear indicator shown in FIG. 1.

Turning to FIGS. 2 and 3, it is seen that the spring clip 40 includes a pair of flanges 48 and 50 that are symmetrical relative to a longitudinal body portion 52 of the spring clip. The flanges 48 and 50 extend at right angles from each side of the longitudinal body portion 52 to a length C that is substantially equal to or greater than the width B of the body portion 52. This structural proportionality provides for the deflection or vibration of the flanges at a larger amplitude than the prongs when the prongs are scraping against the rotating disc. When the prongs are engaging the disc, the prongs deflect at a predetermined frequency. This deflection of the prongs is transmitted to the flanges to deflect the flanges at an increased frequency relative to the frequency of deflection of the prongs so that a louder audible signal is generated than when only the prongs vibrate the spring clip 40.

The caliper 16 includes a bridge portion 52 that connects with the reaction arm 24 and extends axially over the friction elements 20 and 22 and the rotor 12 to define a space indicated at A. The U-shaped spring clip is partly disposed in the space A with the flanges 48 and 50 being disposed therein. Viewing FIG. 1, it is seen that the flanges 48 and 50 extend from one of the legs which form the U-shape of the spring clip and that this one leg also terminates in the prongs 44. Consequently, the flanges 48 and 50 are substantially coplanar with the portion of the prongs at the extremity of the one leg. Moreover, the flanges 48 and 50 extend at right angles relative to the prongs 44.

Figure 4:
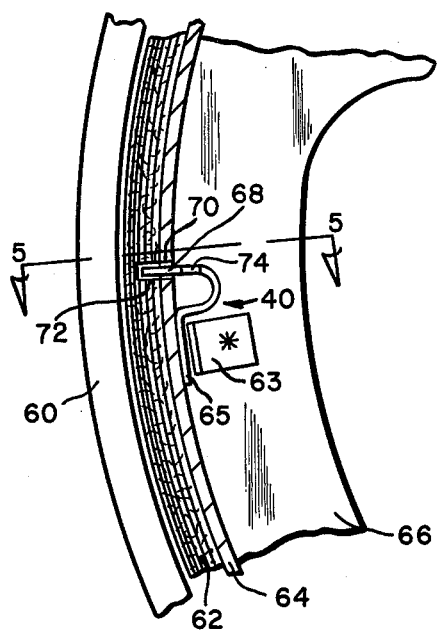
FIG. 4 is a fragmentary view of a drum brake utilizing the brake wear indicator of the present invention.
Figure 5:
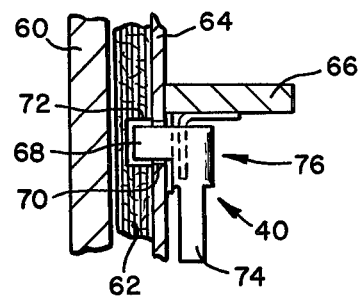
FIG. 5 is a cross-sectional view of FIG. 4 taken along line 5—5.

In the embodiment of FIGS. 4 and 5, a modification of the brake wear indicator 40 is adapted for use with a drum brake. A drum 60 rotates with a rotating portion of an axle assembly (not shown) and a brake shoe 62 is engageable therewith to retard the rotation of the drum. The brake shoe 62 is anchored by any suitable means to a plate 64 which is fixedly secured to a web 66.

The brake wear indicator 40 in FIGS. 4 and 5 is secured to the plate 64 at the one end 65 by any means, such as welding, and extends therefrom to form a generally U-shaped spring clip 40. The other end of the spring clip 40 forms a prong 68 that extends through an opening 70 in the plate 64 and into a cavity 72 in the shoe 62. A stop 63 is secured to the web 66 to prevent this indicator from deflecting out of the cavity 72.

Pursuant to the invention, a flange 74 extends at a right angle from the side of a longitudinal body portion 76 of the spring clip 40. This flange 74 operates in a similar manner to the flanges 48 and 50 of FIGS. 1–3, so that when the prong 68 scrapes against the rotating drum to transmit vibration to the flange 74, the flange 74 vibrates to generate an audible warning signal.

The prong 68 and flange 74 are disposed substantially at right angles to each other and are coplanar with each other. Moreover, the flange 74 is disposed adjacent the prong 68 on the same leg of the U-shaped spring clip 40 that terminates in the prong 68.

Figure 6:
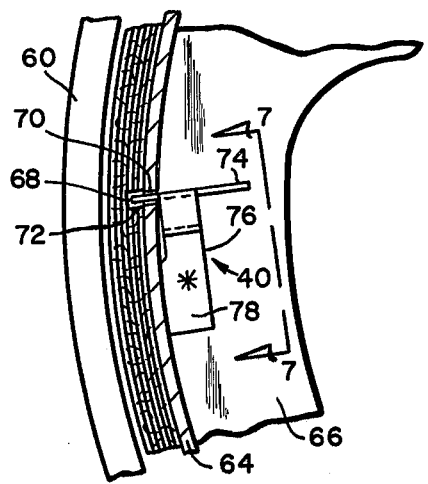
FIG. 6 is a fragmentary view of a drum brake utilizing a modified brake wear indicator according to the present invention.
Figure 7:
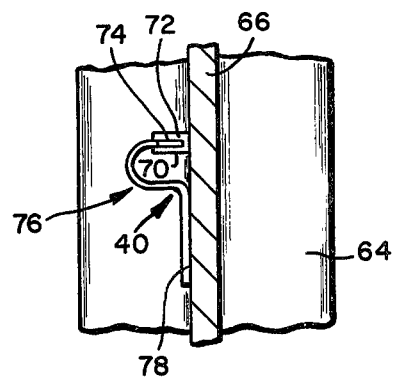
FIG. 7 is a cross-sectional view of FIG. 6 taken along line 7—7.

In the embodiment of FIGS. 6 and 7, the brake wear indicator comprises a generally U-shaped spring clip 40 which is similar to the spring clip 40 of FIGS. 4 and 5 except that the spring clip of FIGS. 6 and 7 is secured at the one end 78 to the web 66 of the drum brake. Consequently, the prong 68 and flange 74 are coaxial. In FIGS. 6 and 7, the prong 68 extends at a right angle from the body portion 76 through an opening 70 in the plate 64 and into a cavity 72 in the shoe 62. The flange 74 of FIGS. 6 and 7 extends from the body portion 76 in an opposite direction to the prong 68 and is disposed adjacent the web 66 but in spaced relation thereto.

MODE OF OPERATION

The brake wear indicator 40 is carried by a brake assembly, be it either a disc or drum brake assembly, and is energized when a friction element or a brake shoe is worn to a predetermined dimension to generate an audible signal to warn the motor vehicle operator of the worn condition of the shoe or element. Consequently, the prong or prongs of the brake wear indicator are positioned at a predetermined distance from the face of the element or shoe, not in contact with the rotating member, so that when the element or shoe has a predetermined dimension of wear left the rotating member will engage the prong or prongs to develop an audible warning system.

With the prong scraping against the rotating member, the spring clip 40 vibrates and this vibration is transmsitted to the flange or flanges which in turn vibrates. The flange or flanges extend at a right angle to a longitudinal body portion of the spring clip 40 and vibrate at a higher frequency and amplitude than the prong or prongs because of the extension from a flexible U-shaped spring clip. Consequently, the brake wear indicator of the present invention provides an audible warning signal that is loud enough to be heard by the vehicle operator.

We claim:

1. In a disc brake having a rotor secured to a rotating portion of an axle housing, a torque member secured to a non-rotating portion of the axle housing and a caliper slidably mounted on the torque member, said caliper cooperating with a pair of friction elements to urge the friction elements into engagement with the rotor, the improvement wherein a brake wear indicator attaches to one of said friction elements, said brake wear indicator comprising a generally U-shaped spring clip defining two substantially parallel legs, one of said legs being secured to said one friction element and the other of said legs having a prong extending therefrom which is engageable with the rotor when said one friction element is worn to a predetermined dimension, said other leg also having a flange extending from said U-shaped spring clip in a direction normal to the prong, said flange being free to vibrate when said prong is engageable with said rotor to generate an audible signal, and said prong comprising a pair of prongs extending normal to said other leg and said flange comprising a pair of flanges extending from each side of said other leg.

* * * * *